(12) United States Patent
Hamano et al.

(10) Patent No.: US 10,790,501 B2
(45) Date of Patent: Sep. 29, 2020

(54) LEAD-ACID BATTERY

(71) Applicant: GS Yuasa International Ltd., Kyoto-shi, Kyoto (JP)

(72) Inventors: Yasuyuki Hamano, Kyoto (JP); Ikumi Motoi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 405 days.

(21) Appl. No.: 15/312,508

(22) PCT Filed: Dec. 19, 2014

(86) PCT No.: PCT/JP2014/006355
§ 371 (c)(1),
(2) Date: Nov. 18, 2016

(87) PCT Pub. No.: WO2015/181865
PCT Pub. Date: Dec. 3, 2015

(65) Prior Publication Data
US 2017/0092934 A1   Mar. 30, 2017

(30) Foreign Application Priority Data

May 26, 2014  (JP) .................................. 2014-108342
Nov. 28, 2014  (JP) .................................. 2014-241469

(51) Int. Cl.
*H01M 4/14* (2006.01)
*H01M 4/62* (2006.01)
(Continued)

(52) U.S. Cl.
CPC ............... *H01M 4/14* (2013.01); *H01M 4/62* (2013.01); *H01M 4/627* (2013.01); *H01M 10/06* (2013.01); *H01M 2004/021* (2013.01)

(58) Field of Classification Search
CPC .......... H01M 4/14; H01M 4/62; H01M 4/627; H01M 10/06
See application file for complete search history.

(56) References Cited

U.S. PATENT DOCUMENTS 4,572,879 A * 2/1986 Morioka ................ H01M 4/14
429/225
6,074,782 A * 6/2000 Mizutani ................ H01M 4/14
429/215
(Continued)

FOREIGN PATENT DOCUMENTS

JP  58123665 A2  7/1983
JP  465062      3/1992
(Continued)

OTHER PUBLICATIONS

PubChem, https://pubchem.ncbi.nlm.nih.gov/compound/25113471#section=Top, accessed Jan. 14, 2019. (Year: 2019).*
(Continued)

*Primary Examiner* — Jonathan G Jelsma
(74) *Attorney, Agent, or Firm* — Rankin, Hill & Clark LLP (57) ABSTRACT

A negative electrode material contains an organic anti-shrink agent which is soluble in water, and the organic anti-shrink agent, when extracted from the negative electrode material with an alkali aqueous solution, has an average particle size of not less than 0.1 μm and not more than 9 μm in sulfuric acid having a specific gravity of 1.25. A lead-acid battery includes a negative electrode plate containing an organic anti-shrink agent having a S element content of 4000 μmol/g or more. The negative electrode contains 0.3 mg/cm³ or more of the S element in the organic anti-shrink agent.

15 Claims, 6 Drawing Sheets

(51) Int. Cl.
   *H01M 10/06* (2006.01)
   *H01M 4/02* (2006.01)

(56) References Cited

U.S. PATENT DOCUMENTS

| | | | |
|---|---|---|---|
| 6,346,347 B1* | 2/2002 | McNally | H01M 4/627 |
| | | | 29/623.5 |
| 6,475,676 B1* | 11/2002 | Sawai | H01M 2/16 |
| | | | 429/248 |
| 2003/0022986 A1* | 1/2003 | Rossi | C08J 3/205 |
| | | | 524/599 |
| 2003/0228525 A1* | 12/2003 | Kozawa | H01M 10/08 |
| | | | 429/347 |
| 2004/0053130 A1 | 3/2004 | Eguchi | |
| 2013/0280595 A1 | 10/2013 | Kogure | |
| 2014/0093775 A1* | 4/2014 | Hardman | H01M 4/20 |
| | | | 429/215 |
| 2014/0134482 A1 | 5/2014 | Okamoto et al. | |

FOREIGN PATENT DOCUMENTS

| | | |
|---|---|---|
| JP | 8287916 A2 | 11/1996 |
| JP | 8298118 A2 | 11/1996 |
| JP | 10144305 A2 | 5/1998 |
| JP | 11250913 A2 | 9/1999 |
| JP | 3385879 B2 | 3/2003 |
| JP | 2003331908 A2 | 11/2003 |
| JP | 2005294027 A2 | 10/2005 |
| JP | 2006196191 A2 | 7/2006 |
| JP | 2007273367 A2 | 10/2007 |
| JP | 4135788 | 8/2008 |
| JP | 2013041848 A2 | 2/2013 |
| WO | 9737393 | 10/1997 |
| WO | 2002039519 | 5/2002 |
| WO | 2012086008 A1 | 6/2012 |

OTHER PUBLICATIONS

International Search Report dated Feb. 17, 2015 filed in PCT/JP2014/006355.

\* cited by examiner

LEAD-ACID BATTERY

TECHNICAL FIELD

The present invention relates to a lead-acid battery

BACKGROUND ART

A negative electrode material of a lead-acid battery contains an organic anti-shrink agent (expander) such as lignosulfonic acid or a sulfonated bisphenol condensation product. Patent Document 1 (JP-A-8-287916) discloses that the high rate discharge performance at low temperature and life performance of a lead-acid battery can be improved by an organic anti-shrink agent. Patent Document 1 indicates that lignosulfonic acid has a low molecular weight, and is therefore eluted from a negative electrode plate into an electrolyte solution easily, and oxidized at a positive electrode plate to disappear. Patent Document 1 discloses that a mixture of a sulfonic acid salt of a styrene-divinylbenzene copolymer as a cation exchange resin and lignosulfonic acid is used, proper high rate discharge performance at low temperature is maintained until the end of life owing to the chemically stable sulfonic acid salt of a styrene-divinylbenzene copolymer.

Patent Document 2 (JP-4135788) discloses an additive for a lead-acid battery, which includes particulate lignin having a particle size of 0.01 to 0.8 μm. Patent Document 2 indicates that a lead-acid battery that has been used for a year can be activated by the additive.

The S element content of the organic anti-shrink agent means the content of sulfonic acid groups, and in this connection, Patent Document 3 (JP-3385879) indicates that when the sulfonation ratio of lignin sulfonic acid is 90% or more, variations in high rate discharge performance at low temperature can be reduced. Patent Document 4 (JP-A-2013-41848) indicates that when a bisphenol condensation product having a S element content of 6 to 10 mass % is used in place of lignin sulfonic acid, charge acceptability is improved. It is indicated that this is because the bisphenol condensation product has a lower $Pb^{2+}$ ion adsorption ability as compared to lignin sulfonic acid.

A sulfonation ratio of 90% in lignin sulfonic acid is equivalent to about 3700 μmol/g in terms of the S element content per mass of the organic anti-shrink agent. A S element content of 6 to 10 mass % in the bisphenol condensation product is equivalent to 1875 μmol/g to 3125 μmol/g in terms of the S element content per mass of the organic anti-shrink agent.

PRIOR ART DOCUMENTS

Patent Documents

Patent Document 1: JP-A-8-287916
Patent Document 2: JP-4135788
Patent Document 3: JP-3385879
Patent Document 4: JP-A-2013-41848

SUMMARY OF THE INVENTION

Problems to be Solved by the Invention

Actually, a state in which lignosulfonic acid as a typical organic anti-shrink agent exists in a negative electrode plate is not so clearly known. The present inventors have found that lignosulfonic acid is aggregated in sulfuric acid, and thus has a larger particle size in sulfuric acid than in neutral water. Accordingly, discussion of the average particle size, the average molecular weight and the like of lignosulfonic acid in an environment other than sulfuric acid is not so meaningful. It is needless to say that lignosulfonic acid exists while being in contact with an electrolyte solution in a negative electrode plate. Further, the present inventors have found that the effect of lignosulfonic acid varies depending on the average particle size of lignosulfonic acid in sulfuric acid. Further, the present inventors have found that the median of the pore size of a negative electrode material varies depending on the average particle size of lignosulfonic acid in sulfuric acid. In other words, lignosulfonic acid having a large average particle size increases the median of the pore size of a negative electrode material. The present inventors have confirmed that the average particle size in sulfuric acid is important for other organic anti-shrink agents as well. Thus, the present inventors have conceived that by controlling the average particle size of an organic anti-shrink agent in sulfuric acid, the pore size of a negative electrode material is controlled to control high rate discharge characteristics at low temperature and durability to a high temperature, leading to the present invention.

An object of the present invention is to improve initial high rate discharge performance at low temperature and decrease deterioration in high rate discharge performance at low temperature due to exposure to a high temperature.

Another object of the present invention is to decrease resistivity in a negative electrode material of a lead-acid battery.

A secondary object of the present invention is to improve the initial value of 0.2 CA discharge performance.

Means for Solving the Problems

A feature of the lead-acid battery of the present invention is that a negative electrode material contains an organic anti-shrink agent which is soluble in water and has an average particle size of not less than 0.1 μm and not more than 9 μm in sulfuric acid having a specific gravity of 1.25.

Another feature of the lead-acid battery of the present invention is that a negative electrode material contains an organic anti-shrink agent which is soluble in water, and the organic anti-shrink agent, when extracted from the negative electrode material with an alkali aqueous solution, has an average particle size of not less than 0.1 μm and not more than 9 μm in sulfuric acid having a specific gravity of 1.25.

Still another feature of the lead-acid battery of the present invention is that a negative electrode material contains an organic anti-shrink agent which is soluble in water under a neutral or basic condition (pH: 7 or more), and the organic anti-shrink agent, when extracted from the negative electrode material with an alkali aqueous solution, has an average particle size of not less than 0.1 μm and not more than 9 μm in sulfuric acid having a specific gravity of 1.25.

When the negative electrode material contains an organic anti-shrink agent having an average particle size of not less than 0.1 μm and not more than 9 μm in sulfuric acid having a specific gravity of 1.25, the median of the pore size of the negative electrode material is, for example, 1.5 μm when the average particle size is 0.9 μm. The content of the organic anti-shrink agent is preferably not less than 0.05 mass % and not more than 0.5 mass % per 100 mass % of the negative electrode material.

The organic anti-shrink agent to be used is soluble in water. Otherwise, the organic anti-shrink agent to be used is soluble in water under a neutral or basic condition (pH: 7 or more). A sulfonic acid salt of a styrene-divinylbenzene copolymer is insoluble in water, and does not form an aggregate. Specifically, the organic anti-shrink agent is, for example, lignosulfonic acid, but it may be sulfomethylated kraft lignin, or a synthetic polymer anti-shrink agent such as polyacrylamide tertiary butyl sulfonic acid. Such a compound may be in the form of an acid, or in the form of a salt such as a sodium salt.

For measuring the average particle size of the organic anti-shrink agent, an organic anti-shrink agent aqueous solution with a concentration of 1 to 10 mg/mL is diluted to 20 times in terms of a volume ratio with sulfuric acid having a specific gravity of 1.26, so that a sulfuric acid solution having a specific gravity of 1.25 is prepared. The organic anti-shrink agent aqueous solution is obtained by taking out an electrode material from a negative electrode plate of a lead-acid battery, washing the electrode material with water to remove sulfuric acid, and then dissolving the electrode material in an alkali such as a 1.0 M (1 mol/L) sodium hydroxide (NaOH) aqueous solution to extract an organic anti-shrink agent. The sample obtained by diluting the organic anti-shrink agent aqueous solution to 20 times with sulfuric acid is measured while being stirred by a magnetic stirrer using a batch type cell at 25° C. in a laser diffraction/scattering type particle size distribution measuring apparatus LA-950 V2 manufactured by HORIBA, Ltd., so that the volume-based average particle size is determined. Coexisting ions such as lead ions, aluminum ions and sodium ions hardly affect the measured value of the average particle size.

For the median of the pore size of the negative electrode material, the pore size distribution is measured over a range of 0.01 µm to 1000 µm by a mercury penetration type pore size distribution measuring apparatus, and the volume-based median is measured. The content of sulfonic acid groups in the organic anti-shrink agent is measured by performing neutralization titration while measuring the electric conductivity using an aqueous solution of an organic compound prepared in the form of an acid beforehand.

Figure 1:
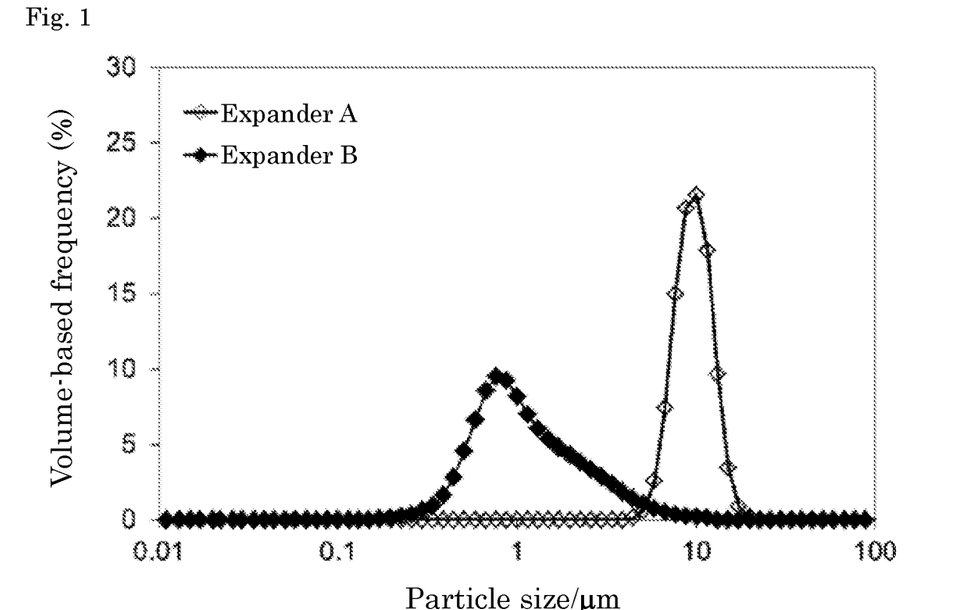
FIG. 1 is a graph showing the particle size distributions of expanders (organic anti-shrink agents) in sulfuric acid, where an expander A corresponds to a conventional example, and an expander B corresponds to an example.
Figure 2:
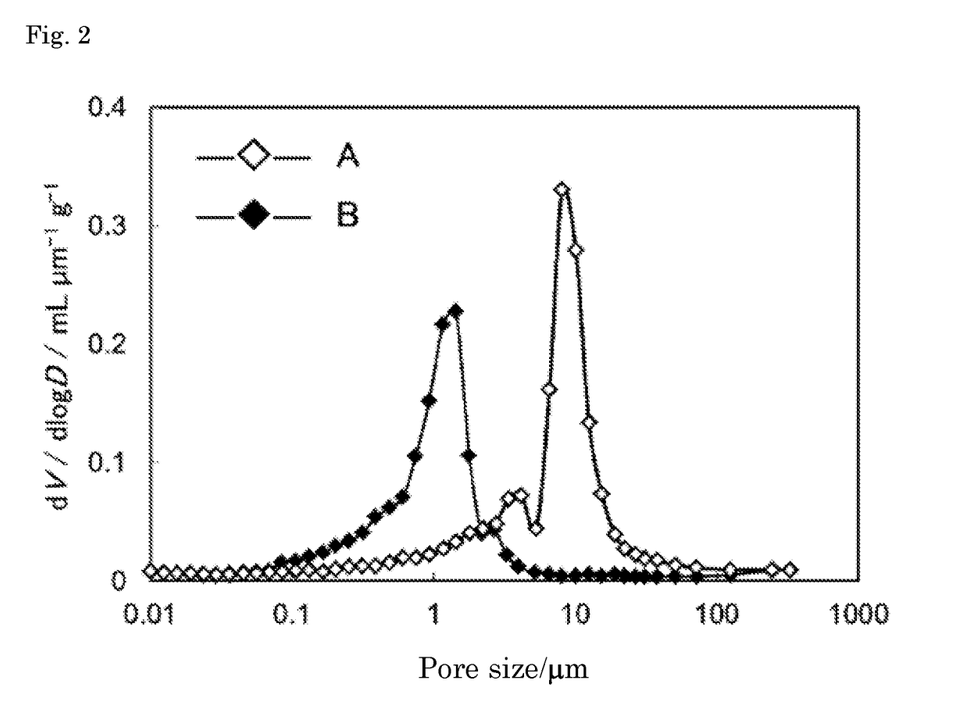
FIG. 2 is a graph showing relations between the differential pore volume of a negative active material after formation and the kind of an expander.

When lignosulfonic acid (hereinafter, referred to as lignin) is hydrolyzed in sulfuric acid at a high temperature, the particle size of the lignin in sulfuric acid can be decreased (FIG. 1). It is considered that the particle size of lignin in sulfuric acid can be reduced by increasing the number of hydrophilic functional groups, for example hydroxyl groups, and the molecular weight of lignin does not significantly affect the particle size of lignin in sulfuric acid. When lignin having a small average particle size in sulfuric acid is used, a negative electrode material having a small pore size is obtained, and when lignin having a large average particle size in sulfuric acid is used, a negative electrode material having a large pore size is obtained (FIG. 2). When a negative electrode material having a small pore size is used, a high level of high rate discharge performance at low temperature is obtained. The pore size of the negative electrode material is controlled by the average particle size of lignin in sulfuric acid.

Figure 3:
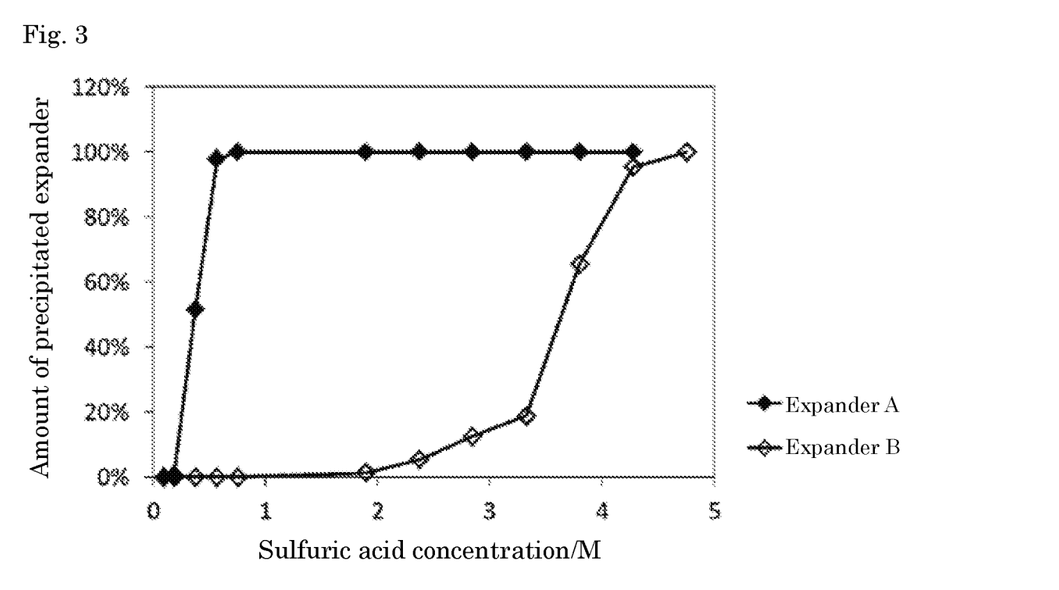
FIG. 3 is a graph showing relations between the amount of an expander precipitated from an expander sulfuric acid solution and the sulfuric acid concentration.

When sulfuric acid is added to a lignin aqueous solution, lignin is sedimented to obtain a supernatant having a low absorbance, and the sedimented lignin is in the form of aggregated colloids. This suggests that the particle size of colloidal particles of aggregated lignin is determined depending on the sulfuric acid concentration (FIG. 3).

Figure 4:
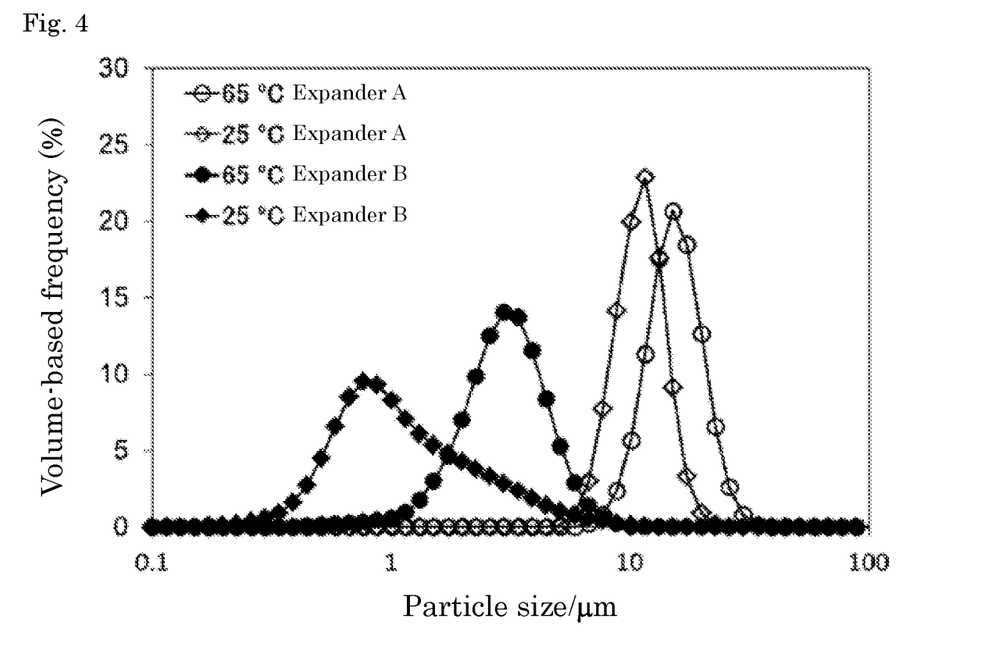
FIG. 4 is a graph showing the particle size distributions of expanders A and B in sulfuric acid at 65° C. and in sulfuric acid at 25° C.
Figure 5:
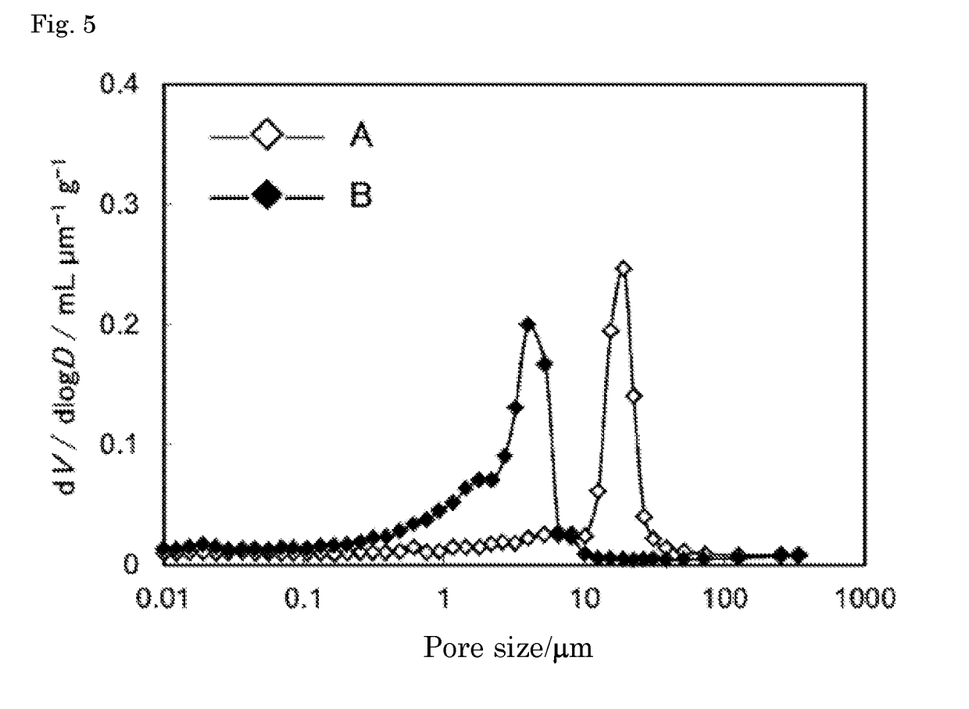
FIG. 5 is a graph showing relations between the differential pore volume of a negative active material after high-temperature overcharge and the kind of an expander.

When a sulfuric acid solution of lignin is heated, the particle size of lignin increases (FIG. 4). When a lead-acid battery is overcharged at a high temperature, the pore size of the negative electrode material increases (FIG. 5). Accordingly, when the lead-acid battery is exposed to a high temperature by high-temperature overcharge etc., the particle size of lignin increases, and the pore size of the negative electrode material also increases. When lignin having a large particle size in sulfuric acid is used, high rate discharge performance at low temperature is markedly reduced in exposure to high-temperature overcharge.

Figure 6:
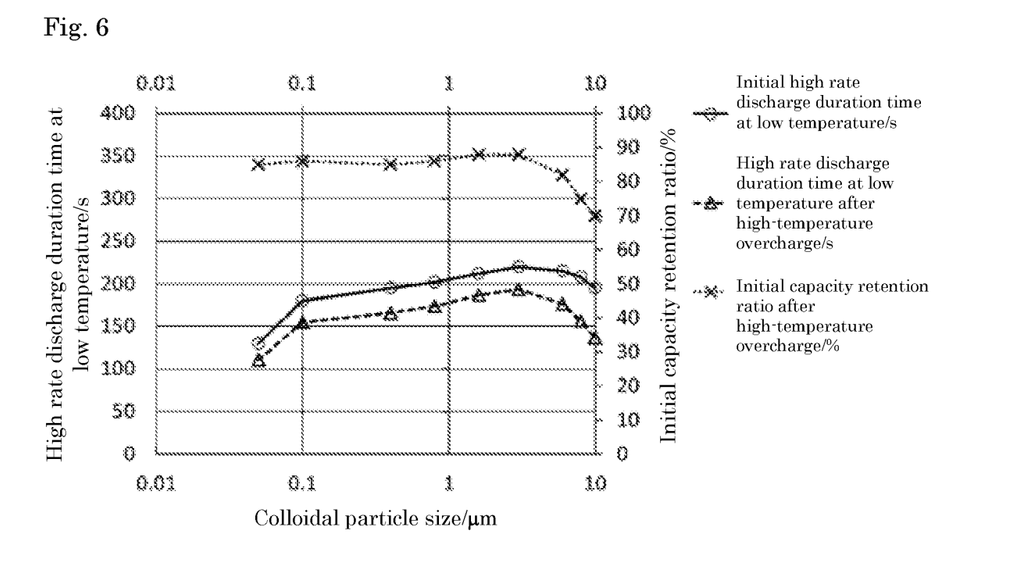
FIG. 6 is a graph showing relations between the colloidal particle size of an organic anti-shrink agent in sulfuric acid and the high rate discharge performance at low temperature.
Figure 7:
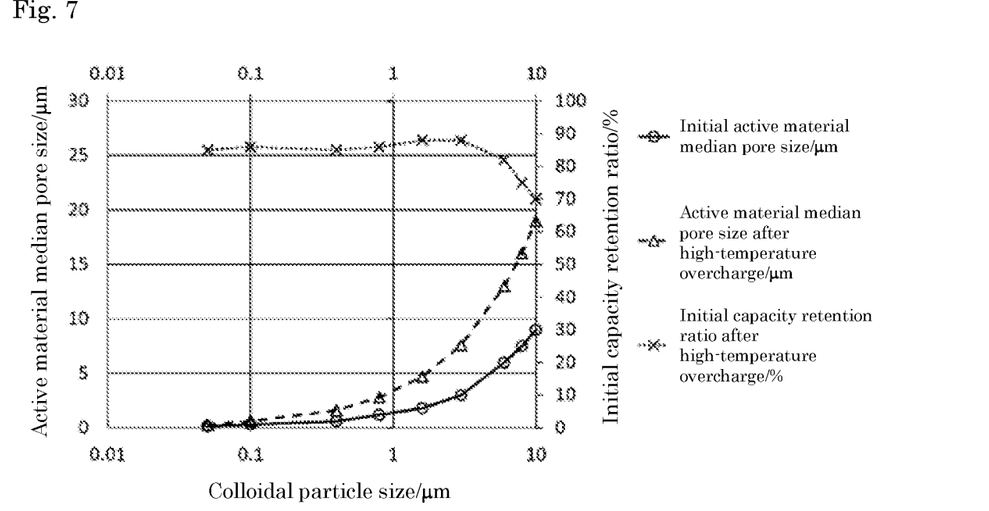
FIG. 7 is a graph showing relations between the colloidal particle size of an organic anti-shrink agent in sulfuric acid and the median of the pore size of an active material.

There is an optimum range in the average particle size of lignin, and high rate discharge performance at low temperature is not improved with lignin having an extremely small average particle size (Table 1 and FIG. 6). Thus, the average particle size of lignin in sulfuric acid is not less than 0.1 µm and not more than 9 µm, more preferably not less than 0.4 µm and not more than 9 µm, most preferably not less than 0.4 µm and not more than 8 µm (Table 1. Table 2, FIG. 6 and FIG. 7).

Studies on lignin also apply to other organic anti-shrink agents, and when the average particle size in sulfuric acid is not less than 0.1 µm and not more than 9 µm, a lead-acid battery which is excellent in initial value of high rate discharge performance at low temperature and has a small reduction in high rate discharge performance at low temperature even when exposed to a high temperature is obtained (Table 3). For decreasing the average particle size of the organic anti-shrink agent in sulfuric acid, for example, it is effective to increase the amount of hydrophilic functional groups per monomer molecule or per basic backbone.

In the present invention, the average particle size of the organic anti-shrink agent in sulfuric acid is optimized to improve the initial value of high rate discharge performance at low temperature (also referred to as high rate performance at low temperature) and decrease a reduction in high rate discharge performance at low temperature due to exposure to a high temperature.

A feature of the present invention is a lead-acid battery including: a negative electrode plate; a positive electrode plate; and an electrolyte solution, wherein a negative electrode material contains an organic anti-shrink agent, and the negative electrode material contains 0.3 mg/cm$^3$ or more of a S element in the organic anti-shrink agent.

A feature of the present invention is a negative electrode plate of a lead-acid battery, the negative electrode plate including: a negative electrode material containing an organic anti-shrink agent; and a current collector, wherein the negative electrode material contains 0.3 mg/cm$^3$ or more of a S element in the organic anti-shrink agent.

Figure 12:
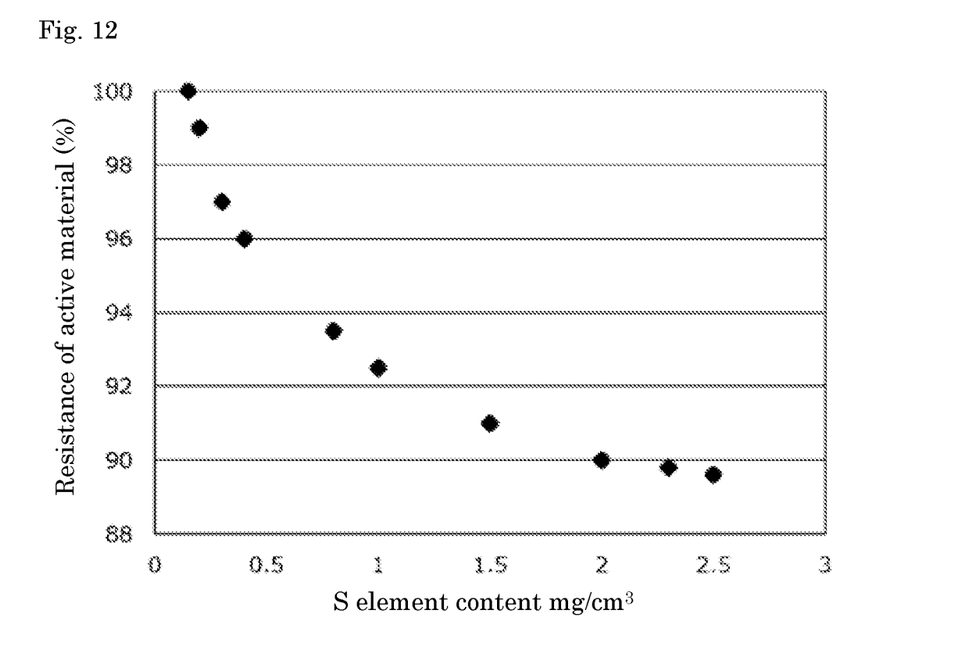
FIG. 12 is a characteristic graph showing a relation between the S element content per volume and the resistance value in a negative active material.

When the S element content per volume of the negative electrode material is increased, resistivity decreases, resulting in improvement of charge acceptability and improvement of high rate discharge performance at low temperature (FIG. 12 and Table 9). The decrease in resistivity is noticeable when the S element content of the negative electrode material is 0.3 mg/cm$^3$ or more, and the decrease in resistivity is further noticeable when the S element content of the negative electrode material is 0.4 mg/cm$^3$ or more. The dependency on the S element content decreases at 1.5 mg/cm$^3$ or more, and further decreases at 2.3 mg/cm$^3$ or more, and therefore the S element content is preferably 1.5 mg/cm$^3$ or less, especially preferably 2.3 mg/cm$^3$. Accordingly, the S element content is preferably not less than 0.3 mg/cm$^3$ and not more than 2.3 mg/cm$^3$, especially preferably not more than 0.4 mg/cm$^3$ and not less than 1.5 mg/cm$^3$. The S element in the organic anti-shrink is influential, and the S element in barium sulfate etc. is irrelevant to the present invention.

The present invention provides a lead-acid battery including: a negative electrode plate; a positive electrode plate; and an electrolyte solution, wherein a negative electrode material contains an organic anti-shrink agent, and the S element content of the organic anti-shrink agent is 4000 μmol/g or more. The S element content is especially preferably not less than 4000 μmol/g and not more than 6000 μmol/g, most preferably not less than 4500 μmol/g and not more than 6000 μmol/g. A S element content of not less than 4000 μmol/g and not more than 6000 μmol/g means that the S element content of the organic anti-shrink agent is not less than 128 mg/g and not more than 192 mg/g, and a S element content of 4500 μmol/g means that the S element content of the organic anti-shrink agent is 144 mg/g.

The present invention provides a negative electrode plate of a lead-acid battery, the negative electrode plate including: a negative electrode material containing an organic anti-shrink agent; and a current collector, wherein the S element content of the organic anti-shrink agent is 4000 μmol/g or more. The S element content is especially preferably not less than 4000 μmol/g and not more than 6000 μmol/g, most preferably not less than 4500 μmol/g and not more than 6000 μmol/g.

Figure 8:
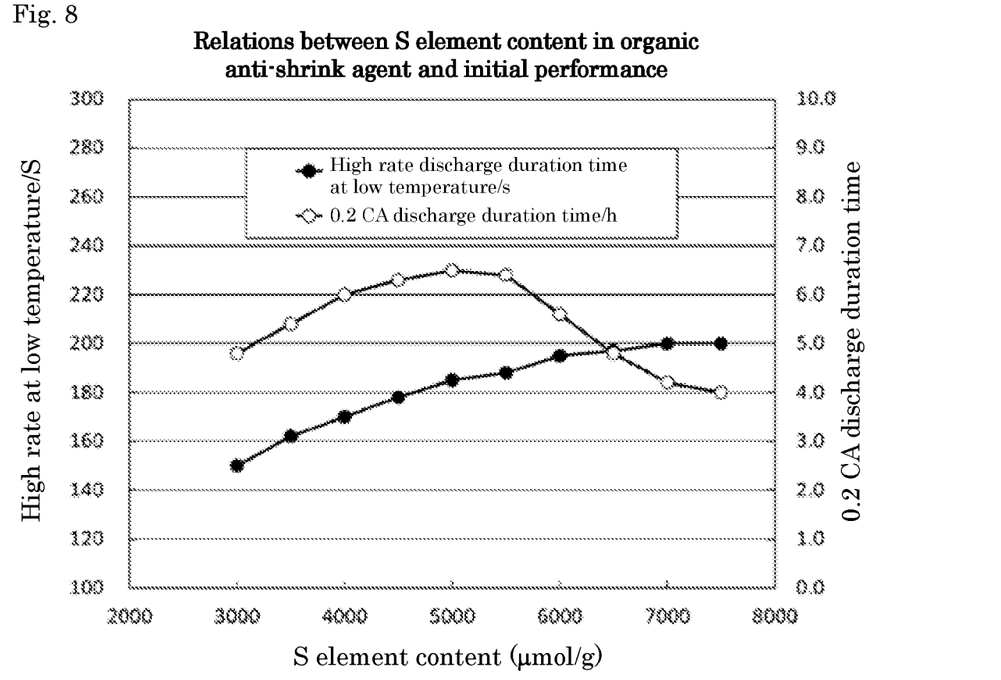
FIG. 8 is a characteristic graph showing relations between the S element content in an organic anti-shrink agent and the initial performance.
Figure 9:
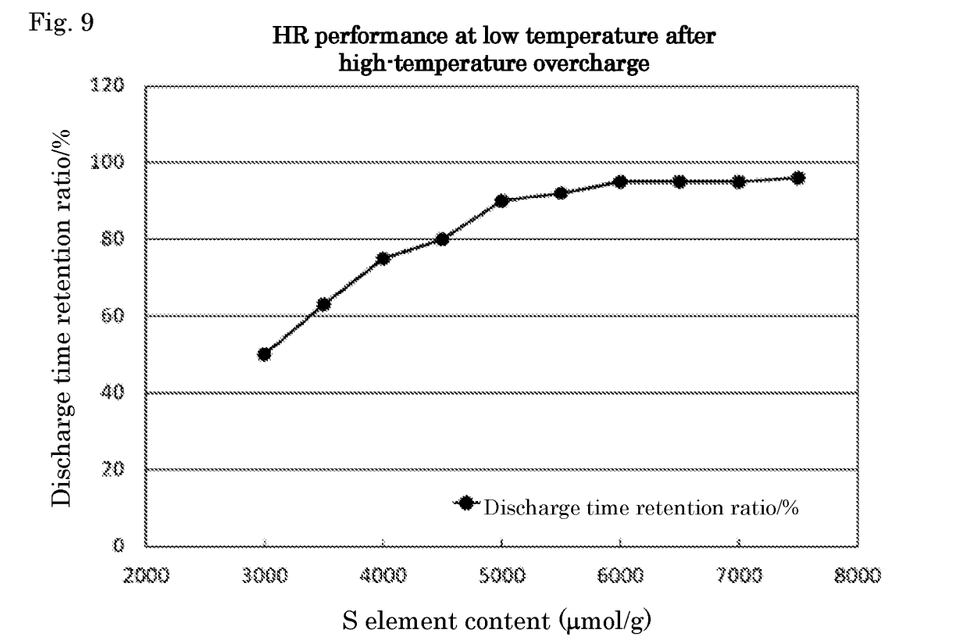
FIG. 9 is a characteristic graph showing a relations between the S element content in an organic anti-shrink agent and the high rate discharge performance at low temperature after high-temperature overcharge.

When the S amount in the organic anti-shrink agent is increased, the initial value of high rate discharge performance at low temperature increases and the ratio of deterioration in high rate discharge performance at low temperature after the high-temperature durability test decreases when the S element content is 4000 μmol/g or more (see Table 4, Table 5, FIG. 8 and FIG. 9). Therefore, in the present invention, by setting the S element content of the organic anti-shrink agent to 4000 μmol/g or more, the initial value of high rate discharge performance at low temperature is improved, and the ratio in high rate discharge performance at low temperature in exposure to a high-temperature durability test is decreased.

Examination of the duration time of 0.2 CA discharge where CA is a rated 5-hour rate capacity shows that the duration time of 0.2 CA discharge is improved until the S amount reaches 6000 μmol/g. However, when the S amount exceeds 6000 μmol/g, the duration time of 0.2 CA discharge decreases (FIG. 8 and Table 4). Thus, the S element content of the organic anti-shrink agent is set to not less than 4000 μmol/g and not more than 6000 μmol/g to improve the initial value of the duration time of 0.2 CA discharge. The effect of the S element in the organic anti-shrink agent is particularly high when the S element content is 4500 μmol/g or more.

In lignin sulfonic acid, it is not easy to set the S element content to 4000 μmol/g or more, and therefore it is preferable to use a synthetic organic anti-shrink agent such as a bisphenol condensation product containing a sulfonic acid group, a sulfonyl group or the like. However, a condensation product of a bisphenyl compound other than phenol, for example a condensation product of N,N'-(sulfonyldi-4,1-phenylene)bis(1,2,3,4-tetrahydro-6-methyl-2,4-dioxopyrimidine-5-sulfonamide) may be used. As the bisphenol condensation product, for example, a condensation product with formaldehyde such as bisphenol A, S or F containing a sulfonic acid group may be used, and bisphenol S has a sulfonyl group (—SO2-) in addition to the sulfonic acid group, so that the S element content is increased. The sulfonic acid group is not required to be directly bonded to the phenyl group in a bisphenol, and for example, as described in Patent Document 4, an alkyl chain etc. may be bonded to a bisphenol as an alkyl-aminobenzenesulfonic acid etc.

The total content of the S element in the organic anti-shrink agent matters, and groups containing a stable S element in the negative electrode plate of the lead-acid battery are, for example, a sulfonic acid group and a sulfonyl group. Thus, it is preferable that the S element exists as any of these groups. Performance as the organic anti-shrink agent hardly depends on whether the S element exists as a sulfonic acid group, or as a sulfonyl group (see Table 7).

A mechanism in which the S element content affects high rate discharge performance at low temperature and the duration time of 0.2 CA discharge is considered as follows. Particles of the organic anti-shrink agent are mutually associated to form colloidal particles, and groups having electron acceptability and high polarity, such as sulfonic acid groups and sulfonyl groups, are apt to appear on the surfaces of the colloidal particles. As a result, association of the organic anti-shrink agent is slacked to decrease the particle size of the colloidal particles. Accordingly, the pore size of the negative electrode material in which the organic anti-shrink agent is dispersed decreases. The present inventors measured the colloidal particle size of the organic anti-shrink agent and the pore size of the negative electrode material, and confirmed that the pore size decreased with an increase in S element content (Table 6, FIG. 10 and FIG. 11).

The present invention also has the following features.

1. A negative electrode plate of a lead-acid battery, the negative electrode plate including a negative electrode material, wherein the negative electrode material contains an organic anti-shrink agent, and the organic anti-shrink agent is soluble in water, and has an average particle size of not less than 0.1 μm and not more than 9 μm in sulfuric acid having a specific gravity of 1.25.

2. A negative electrode plate of a lead-acid battery: the negative electrode plate including a negative electrode material, wherein the negative electrode material contains an organic anti-shrink agent, the organic anti-shrink agent is soluble in water, and the organic anti-shrink agent, when extracted from the negative electrode material with an alkali aqueous solution, has an average particle size of not less than 0.1 μm and not more than 9 μm in sulfuric acid having a specific gravity of 1.25.

3. A negative electrode plate of a lead-acid battery, the negative electrode plate including a negative electrode material, wherein the negative electrode material contains an organic anti-shrink agent, the organic anti-shrink agent is soluble in water under a neutral or basic condition (pH: 7 or more), and the organic anti-shrink agent, when extracted from the negative electrode material with a 1 M (1 mol/L) sodium hydroxide (NaOH) aqueous solution, has an average particle size of not less than 0.1 μm and not more than 9 μm in sulfuric acid having a specific gravity of 1.25.

4. The negative electrode plate of a lead-acid battery according to any one of 1 to 3, wherein the average particle size of the organic anti-shrink agent in sulfuric acid having a specific gravity of 1.25 is not less than 0.4 μm and not more than 9 μm.

5. The negative electrode plate of a lead-acid battery according to any one of 1 to 3, wherein the average particle size of the organic anti-shrink agent in sulfuric acid having a specific gravity of 1.25 is not less than 0.4 μm and not more than 8 μm.

6. The negative electrode plate of a lead-acid battery according to any one of 1 to 5, wherein the negative electrode material contains lignosulfonic acid hydrolyzed in sulfuric acid.

7. A method for producing the negative electrode plate of a lead-acid battery according to 6, wherein the lignosulfonic acid is hydrolyzed in sulfuric acid, and then included in the negative electrode material.

8. A negative electrode plate of a lead-acid batter: the negative electrode plate including a negative electrode material, wherein the negative electrode material contains an organic anti-shrink agent, the negative electrode material contains a S element in the organic anti-shrink agent, and the organic anti-shrink agent contains the S element in an amount of 0.3 mg or more per unit volume (1 cm$^3$) of the negative electrode material.

9. The negative electrode plate of a lead-acid battery according to 8, wherein the organic anti-shrink agent contains the S element in an amount of 0.4 mg or more per unit volume (1 cm$^3$) of the negative electrode material.

10. A negative electrode plate of a lead-acid battery the negative electrode plate including a negative electrode material, wherein the negative electrode material contains an organic anti-shrink agent, and the organic anti-shrink agent contains 4000 μmol/g or more of the sulfur element (S element).

11. The negative electrode plate of a lead-acid battery according to any one of 8 to 10, wherein the content of the sulfur element (S element) in the organic anti-shrink agent is not less than 4000 μmol/g and not more than 6000 μmol/g.

12. The negative electrode plate of a lead-acid battery according to any one of 8 to 10, wherein the content of the sulfur element (S element) in the organic anti-shrink agent is not less than 4500 μmol/g and not more than 6000 μmol/g.

13. The negative electrode plate of a lead-acid battery according to any one of 8 to 12, wherein the organic anti-shrink agent is a synthetic organic anti-shrink agent.

14. The negative electrode plate of a lead-acid battery according to any one of 8 to 13, wherein the organic anti-shrink agent contains a S element of at least one of a sulfonic acid group and a sulfonyl group.

15. The negative electrode plate of a lead-acid battery according to any one of 8 to 14, wherein the organic anti-shrink agent is a bisphenol condensation product containing a sulfur element (S element).

16. The negative electrode plate of a lead-acid battery according to any one of 1 to 15, wherein the median of the pore size of the negative electrode material is not less than 0.3 μm and not more than 8.0 μm.

17. The negative electrode plate of a lead-acid battery according to any one of 1 to 15, wherein the median of the pore size of the negative electrode material is not less than 0.6 μm and not more than 8.0 μm.

18. The negative electrode plate of a lead-acid battery according to any one of 1 to 15, wherein the median of the pore size of the negative electrode material is not less than 0.6 μm and not more than 7.5 μm.

19. The negative electrode plate of a lead-acid battery according to any one of 1 to 18, wherein the negative electrode material contains the organic anti-shrink agent in an amount of not less than 0.05 mass % and not more than 0.5 mass %.

In this specification, the whole of a washed and dried electrode plate, from which a current collector is removed, is an electrode material, and the electrode material contains additives such as a conductive material, a reinforcing material and an anti-shrink agent. In an example, the electrode material is referred to simply as an active material, and the electrode material is identical to the active material.

MODE FOR CARRYING OUT THE INVENTION

An optical example of the invention of the present application will be shown below. In implementation of the invention of the present application, the example can be appropriately modified in accordance with the common knowledge of a person skilled in the art and the disclosure of a prior art.

EXAMPLE

Preliminary Test

Lignosulfonic acid was hydrolyzed in sulfuric acid having a specific gravity of 1.25 at 160° C. by an autoclave. The hydrolysis temperature is preferably 140° C. or higher. Lignosulfonic acid that was not hydrolyzed was designated as an expander A, and lignosulfonic acid that was hydrolyzed was designated as an expander B. A lead powder as a main component, 0.1 mass % of the expander, 0.15 mass % of carbon black, 0.3 mass % of barium sulfate and 0.1 mass % of a reinforcing material were formed into a paste with sulfuric acid in such a manner they were included in a negative electrode material, and a lead alloy grid was filled with the paste to obtain an unformed negative electrode plate. A lead powder and 0.1 mass % of a reinforcing material were formed into a paste with sulfuric acid, and a lead alloy grid was filled with the paste to obtain an unformed positive electrode plate. The negative electrode plate was wrapped with a polyethylene separator, an electrolyte solution was added to perform container formation, thereby obtaining a flooded lead-acid battery. The characteristics of the lead-acid battery were measured. Use of expanders having different average particle sizes in sulfuric acid is important, and other conditions, particularly presence/absence and the content of barium sulfate, and presence/absence and the content of carbon such as carbon black may be arbitrarily determined.

FIG. 1 shows the particle size distributions of expanders A and B in sulfuric acid having a specific gravity of 1.25 at 25° C. The volume average particle size was 0.9 μm for the expander B, and 10 μm for the expander A.

FIG. 2 shows the pore size distribution of a negative active material after formation. The median of the pore size in terms of the volume was 1.5 μm for the expander B, and 9.0 μm for the expander A, and in the expander B having a small particle size, the pore size of the active material was also small.

FIG. 3 shows relations between the amount of the precipitated expander and the sulfuric acid concentration when a sulfuric acid solution of each of the expanders A and B was stirred overnight, and left standing. In the expander A, sedimentation associated with aggregation started to occur at a sulfuric acid concentration of around 0.8 M (mol/L), whereas in the expander B, sedimentation did not occur up to a sulfuric acid concentration of around 4 M (mol/L). This suggests that an expander of lignin is aggregated in sulfuric acid, and the particle size of colloidal particles of aggregated lignin depends on the sulfuric acid concentration.

FIG. 4 shows the particle size distributions of the expander in sulfuric acid having a specific gravity of 1.25 at 65° C. The average particle size was 15 μm for the expander A, and 3 μm for the expander B. The average particle size of the expander increased under a high-temperature environment. When the pore size distribution of the negative active material was measured after a high-temperature overcharge test of charging a battery at 60° C. for 20 days was conducted, results as shown in FIG. 5 were obtained. The pore size of the negative active material increased in both expanders A and B, but the expander B had a pore size smaller than that of the expander A.

This suggests that expander particles (colloidal particles of the aggregated organic anti-shrink agent) form a steric hindrance to prevent disappearance of small pores. From a performance test of a lead-acid battery, it was found that more excellent high rate discharge performance at low temperature and more excellent durability to high-temperature overcharge are obtained with the expander B having a small average particle size than with the expander A having a large average particle size.

Test 1

Lignin (lignosulfonic acid) having an average particle size of 0.05 μm to 10 μm in sulfuric acid was prepared by changing the hydrolysis time in the same manner as in the preliminary test. The lignin may be added in the form of an acid, or added in the form of a salt such as that of sodium. In addition, lignin that was not hydrolyzed (having an average particle size of 10 μm in sulfuric acid) was provided. Using these lignins, 55D23-type lead-acid batteries were produced by a usual method in the same manner as in the preliminary test. The lignin content in the negative active material was 0.1 mass %. The lignin content is preferably 0.05 mass % to 0.5 mass %. Each lead-acid battery was charged, and the duration time of constant current discharge at 300 A was measured at −15° C., and defined as a high rate discharge duration time at low temperature. Charge at 2.4 A was then continued for 10 days in a water bath at 60° C., the high rate discharge duration time at low temperature was then measured again, and the ratio of the duration time was defined as an initial capacity retention ratio. Further, the pore size distribution of the negative active material after the high-temperature overcharge test was measured, and the volume-based median was measured. The results are shown in Table 1 and Table 2. The colloidal particle size in each table is an average particle size in sulfuric acid having a specific gravity of 1.25, and the colloidal particle size in Table 2 is a value before the high-temperature overcharge test.

TABLE 1

Initial HR performance at low temperature

| | Colloidal particle size/μm | | | | | | | | |
|---|---|---|---|---|---|---|---|---|---|
| | 0.05 | 0.1 | 0.4 | 0.8 | 1.6 | 3 | 6 | 8 | 10 |
| High rate discharge duration time at low temperature/s | 130 | 180 | 195 | 202 | 212 | 220 | 215 | 208 | 195 |
| Initial active material median pore size/μm | 0.15 | 0.3 | 0.6 | 1.2 | 1.8 | 3 | 6 | 7.5 | 9 |

TABLE 2

HR performance at low temperature after high-temperature overcharge

| | Colloidal particle size/μm | | | | | | | | |
|---|---|---|---|---|---|---|---|---|---|
| | 0.05 | 0.1 | 0.4 | 0.8 | 1.6 | 3 | 6 | 8 | 10 |
| High rate discharge duration time at low temperature/s | 111 | 155 | 166 | 174 | 187 | 194 | 176 | 156 | 137 |
| Initial capacity retention ratio/% | 85 | 86 | 85 | 86 | 88 | 88 | 82 | 75 | 70 |
| Active material median pore size/μm | 0.3 | 0.6 | 1.6 | 2.8 | 4.7 | 7.6 | 13 | 16 | 19 |

From Table 1 and FIG. 6, it has been found that when the average particle size of lignin in sulfuric acid is 9 μm or less, the high rate discharge duration time at low temperature increases, and this feature is maintained up to an average particle size of 0.1 μm, more preferably 0.4 μm. From Table 2 and FIG. 7, it has been found that when the average particle size of lignin in sulfuric acid is 9 μm or less, the ratio of reduction in high rate discharge duration time at low temperature due to exposure to high-temperature overcharge can be decreased. Further, it has been found that the average particle size of lignin in sulfuric acid may be reduced for decreasing the median of the pore size of the active material after exposure of high-temperature overcharge. It has been found that when the average particle size of lignin in sulfuric acid is not less than 0.1 μm and not more than 9 μm, more preferably not less than 0.4 μm and not more than 9 μm, most preferably not less than 0.4 μm and not more than 8 μm, higher performance is obtained than when the average particle size of lignin in sulfuric acid is 10 μm or more either for the initial value of high rate discharge performance at low temperature or after exposure to high-temperature overcharge.

Organic Anti-Shrink Agents Other than Lignin

Studies were conducted on the following three synthetic organic anti-shrink agents: polyacrylic acid (average molecular weight: 1000,000: average particle size of 25 μm in sulfuric acid having a specific gravity of 1.25);

polymerization product of polyacrylamide tertiary butyl sulfonic acid Na salt (ATBS polymer: ATBS is a registered trademark); and sulfomethylated kraft lignin.

For the polymerization product of polyacrylamide tertiary butyl sulfonic acid Na salt (ATBS polymer), three products having average molecular weights of 50,000, 75,000 and 100,000 had average particle sizes of 8.0 μm, 6.0 μm and 4.0 μm, respectively, in sulfuric acid having a specific gravity of 1.25. Thus, the descending degree of magnitude for the average particle size was reverse to that for the molecular weight. In the ATBS polymer, the ratio of the basic backbone and the sulfonic acid groups amount was 1:1.

Sulfomethylated kraft lignin is obtained by adding formaldehyde and a sulfite to kraft lignin and treating the mixture under pressure at a high temperature. In sulfomethylated kraft lignin, a sulfonic acid group (H type or Na type) is introduced as —CH2-SO3H(Na) through a methylene group. Sulfomethylated kraft lignin is different from conventional lignosulfonic acid in the position of the sulfonic acid group. The amount of sulfonic acid groups per basic backbone was controlled to fall within the range of 0.05 to 0.4 by changing the amounts of formaldehyde and a sulfite. i.e. conditions for sulfomethylation with the average molecular weight set to 12,000, so that the average particle size in sulfuric acid having a specific gravity of 1.25 was controlled to fall within the range of 1.4 μm to 17.0 μm.

Except that in place of conventional lignosulfonic acid, 0.1 mass % of each of the above-mentioned organic anti-shrink agents was included in the negative active material, the same procedure as in the preliminary test and the test was carried out to produce a lead-acid battery and the initial value of high rate discharge performance at low temperature and the value after the high-temperature overcharge test were measured. The results are shown in Table 3 along with data in the conventional example using lignosulfonic acid (lignin).

TABLE 3

Colloidal particle size of each organic compond and electrode performance

| Substance name | Lignosulfonic acid | Polyacrylic acid | ATBS-Na polymerization product* | | | Sulfomethylated kraft lignin** | | | | | |
|---|---|---|---|---|---|---|---|---|---|---|---|
| Average molecular weight | 13000 | 1000000 | 50000 | 75000 | 100000 | 12000 | 12000 | 12000 | 12000 | 12000 | 12000 |
| Sulfonic acid group amount vs basic backbone | 0.13 | — | 1 | 1 | 1 | 0.05 | 0.08 | 0.1 | 0.15 | 0.25 | 0.4 |
| Colloidal particle size/μm | 10.0 | 25.0 | 8.0 | 6.0 | 4.0 | 17.0 | 14.0 | 12.0 | 8.0 | 4.2 | 1.4 |
| High rate discharge duration time at low temperature (initial)/s | 195 | 188 | 211 | 213 | 219 | 135 | 152 | 178 | 212 | 218 | 216 |
| High rate discharge duration time at low temperature (after overcharge)/s | 137 | 85 | 156 | 177 | 191 | 74 | 91 | 121 | 161 | 187 | 192 |
| Initial capacity retention ratio/% | 70 | 45 | 74 | 83 | 87 | 55 | 60 | 68 | 76 | 86 | 89 |
| Initial active material median pore size/μm | 9 | >20 | 7.0 | 5.6 | 4.1 | 18.5 | 13.5 | 11.0 | 7.0 | 4.3 | 1.9 |

*ATBS is a registered trademark.
**Sulfomethylated kraft lignin is lignin obtained by sulfonating kraft lignin with formaldehyde and a sulfite, and is different from conventional lignosulfonic acid in the position of the sulfonic acid group.

In any of the organic anti-shrink agents, the average particle size in sulfuric acid having a specific gravity of 1.25 was set to 9 μm or less to obtain the following effect:

high rate discharge performance at low temperature can be improved; and even after exposure to overcharge at a high temperature, high rate discharge performance at low temperature is high, and the retention ratio of high rate discharge performance at low temperature can be increased.

Test 2

Production of Lead-Acid Battery

A lead powder, an organic anti-shrink agent composed of a bisphenol condensation product, carbon black, barium sulfate and a synthetic fiber reinforcing material were mixed in water and sulfuric acid to obtain a negative active material paste. A negative active material (exactly a negative electrode material) after formation contained 0.15 mass % of the organic anti-shrink agent, 0.2 mass % of carbon black, 1.0 mass % of barium sulfate, and 0.05 mass % of the synthetic fiber reinforcing material. As a preferred range of the content of each of these components, the content of the organic anti-shrink agent is not less than 0.08 mass % and not more than 0.25 mass %, and the content of carbon black is 1.0 mass % or less, or carbon black may be absent, or may be changed to other carbon such as flaky graphite. Preferably, the content of barium sulfate is not less than 0.5 mass % and not more than 2.0 mass %, and the content of the synthetic fiber reinforcing material is not less than 0.03 mass % and not more than 0.2 mass %. An expanded grid composed of a Pb—Ca—Sn-based alloy was filled with the negative active material paste, and drying and curing was performed to obtain an unformed negative electrode plate.

In the example, a condensation product of sulfonic acid group-containing bisphenol A with formamide and a condensation product of sulfonic acid group-containing bisphenol S with formaldehyde were used as the organic anti-shrink agent. Conditions for sulfonation were made severer than before, so that the average of the number of sulfonic acid groups per molecule of bisphenol increased as compared to before. Sulfonation was performed after the mixture of bisphenols A. F and S was condensed. In this manner, the S element content was adjusted to fall within the range of 3000 µmol/g to 7500 µmol/g. A condensation product derived from bisphenol A contains a sulfonic acid group, and a condensation product derived from bisphenol S contains a sulfonic acid group and a sulfonyl group. In addition, lignin sulfonic acid having a S element content of 600 µmol/g was provided as a comparative example. The kind of the lead powder, production conditions, the content of red lead, and so on may be arbitrarily determined, and a third component such as a very small amount of Sb element may also be added.

A lead powder and a synthetic fiber reinforcing material (0.1 mass % based on the amount of a formed positive active material) were mixed in water and sulfuric acid to obtain a positive active material paste. An expanded grid composed of a Pb—Ca—Sn-based alloy was filled with the paste, and drying and curing was performed to obtain an unformed positive electrode plate.

An element was formed by five negative electrode plates and four positive electrode plates with the negative electrode plates surrounded by a microporous bag-shaped polyethylene separator, and the element was stored in a polypropylene container to perform container formation, thereby obtaining a liquid-type automotive battery. The rated 5-hour rate capacity CA is 25 Ah, and the power is 12 V. The battery is not limited to one for automotive use, and may be a battery for any use, and the battery may be a liquid-type battery, or a valve regulated battery.

Measurement Method

The content of the organic anti-shrink agent and the S element content in the negative active material, and the pore size of the negative electrode material are measured in the following manner. A fully charged lead-acid battery is disassembled, a negative electrode plate is taken out, and washed with water to remove a sulfuric acid component, and the dry weight is measured. An active material is separated from the negative electrode plate, and immersed in a 1 mol/l sodium hydroxide (NaOH) aqueous solution to extract an organic anti-shrink agent. The content of the anti-shrink agent is measured using a calibration curve prepared beforehand with an absorbance obtained using an ultraviolet-visible absorption spectrometer. The sodium hydroxide (NaOH) aqueous solution of the organic anti-shrink agent obtained by extraction from the active material is desalted, and concentrated and dried. A S element in 0.1 g of the organic anti-shrink agent is converted into sulfuric acid by an oxygen combustion flask method, the eluate is titrated with barium perchlorate using thorin as an indicator to determine a titer, and the S element content in the organic anti-shrink agent is calculated from the titer. For the dried negative active material, the pore size distribution is measured by a mercury penetration method, and the volume-based median is defined as a median pore size. Here, portions with a measured pore size of 100 µm or more are considered as gaps between active material particles rather than pores, and are not included in pores. The volume of the active material is determined by subtracting the volume of pores with a measured pore size of 100 µm or more from the apparent volume.

Performance of Lead-Acid Battery

For each lead-acid battery, the initial value of high rate discharge performance at low temperature (time (seconds) taken for the terminal voltage to decrease to 6.0 V at a discharge current of 150 A at −15° C.), and the time taken for the terminal voltage to decrease to 10.5 V at a discharge current of 0.2 CA were measured. The results are shown in FIG. 8 and Table 4.

TABLE 4

Relations between S element content in organic anti-shrink agent and initial performance

| | S element content/µmol/g | | | | | | | | | | |
| --- | --- | --- | --- | --- | --- | --- | --- | --- | --- | --- | --- |
| | 3000 | 3500 | 4000 | 4500 | 5000 | 5500 | 6000 | 6500 | 7000 | 7500 | 600* |
| High rate discharge duration time at low temperature/s | 150 | 162 | 170 | 178 | 185 | 188 | 195 | 197 | 200 | 200 | 153 |
| 0.2 CA discharge duration time/h | 4.8 | 5.4 | 6.0 | 6.3 | 6.5 | 6.4 | 5.6 | 4.8 | 4.2 | 4.0 | 4.8 |

*The sample with a S element content of 600 µmol/g is composed of lignin sulfonic acid, and shown as a comparative example.

High rate discharge performance at low temperature increased with an increase in S element content, and the upper limit was about 200 seconds. When the S element content exceeded 6000 µmol/g, the high rate discharge time at low temperature no longer significantly increased even when the S element content was increased. The duration time of 0.2 CA discharge was large at a S element content of not less than 4000 µmol/g and not more than 6000 µmol/g, and reached the maximum at a S element content of not less than 4500 µmol/g and not more than 5500 µmol/g.

The lead-acid battery, the initial characteristics of which had been measured, was exposed to high-temperature overcharge by charge at 2.5 A for 240 hours at 65° C., and high rate discharge performance at low temperature was then measured. The ratio of high rate discharge performance at low temperature after high-temperature overcharge and the initial value of high rate discharge performance at low temperature is shown in FIG. 9 and Table 5.

TABLE 5

HR performance at low temperature after high-temperature overcharge

| | S element content/μmol/g | | | | | | | | | | |
|---|---|---|---|---|---|---|---|---|---|---|---|
| | 3000 | 3500 | 4000 | 4500 | 5000 | 5500 | 6000 | 6500 | 7000 | 7500 | 600* |
| High rate discharge duration time at low temperature/s | 75 | 102 | 128 | 142 | 167 | 173 | 185 | 187 | 190 | 192 | 77 |
| Discharge time retention ratio/% | 50 | 63 | 75 | 80 | 90 | 92 | 95 | 95 | 95 | 96 | 50 |

*The sample with a S element content of 600 μmol/g is composed of lignin sulfonic acid, and shown as a comparative example.

It has become apparent that as the S element content increases, high rate discharge performance at low temperature after high-temperature overcharge is improved, and the discharge time retention ratio increases.

From these results, it has become apparent that when the organic anti-shrink agent contains a S element in a larger amount than before, there is such a range of the S element content that both initial high rate discharge performance at low temperature and high rate discharge performance at low temperature after high-temperature overcharge can be improved, and the duration time of 0.2 CA discharge can be increased. This range of the S element content in the organic anti-shrink agent is a range of not less than 4000 μmol/g and not more than 6000 μmol/g. When the S element content is in the range of not less than 4500 μmol/g and not more than 6000 μmol/g, a lead-acid battery particularly excellent in both initial high rate discharge performance at low temperature and high rate discharge performance at low temperature after high-temperature overcharge is obtained.

Figure 10:
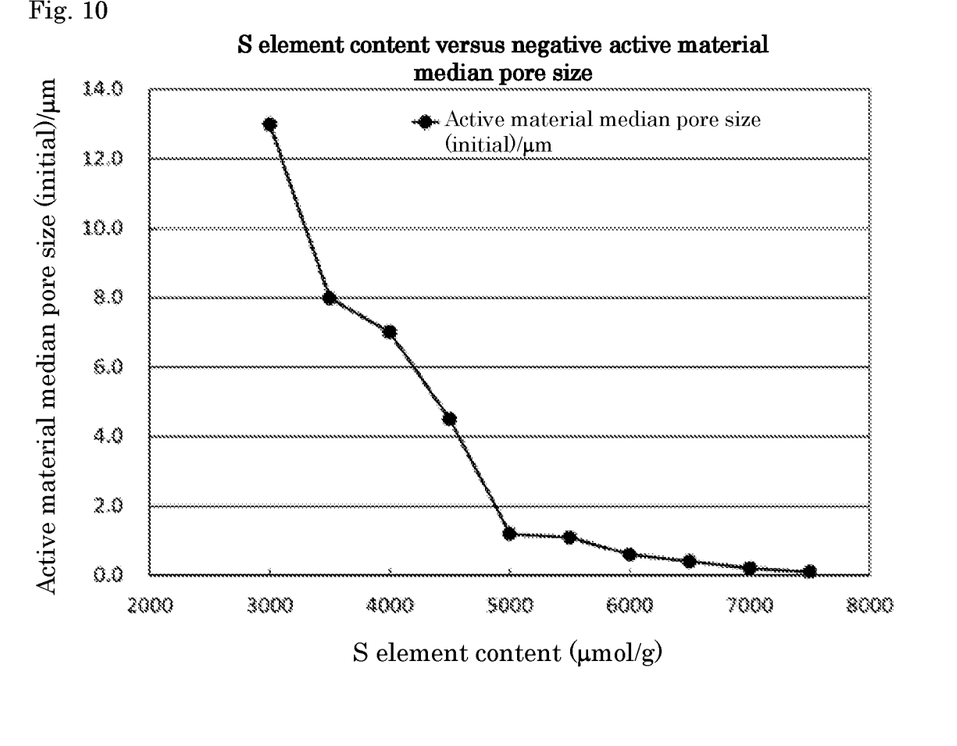
FIG. 10 is a characteristic graph showing a relation between the S element content in an organic anti-shrink agent and the median pore size in a negative active material.
Figure 11:
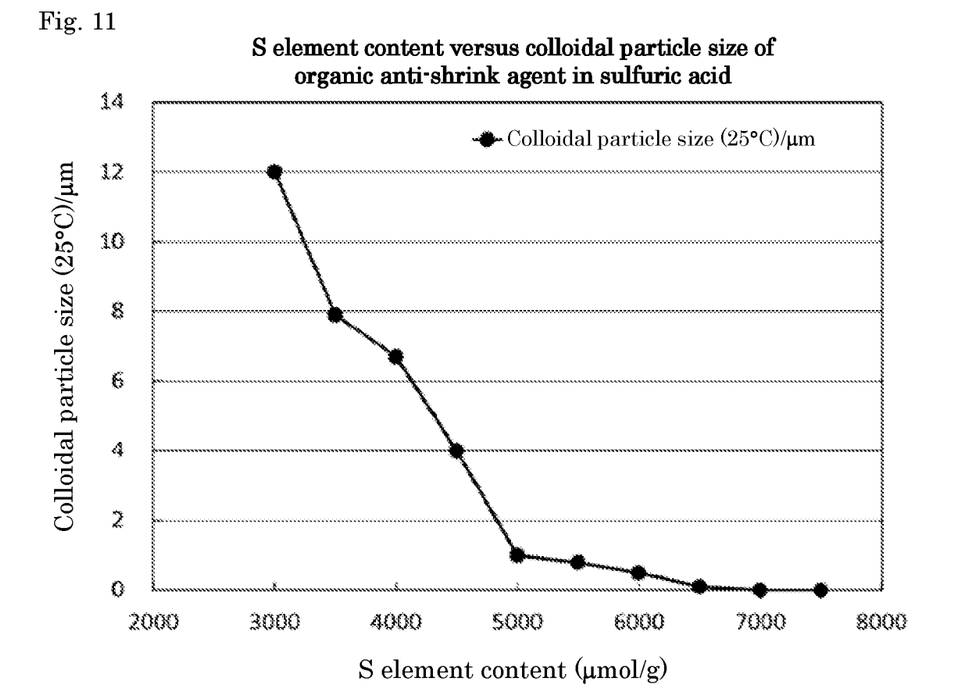
FIG. 11 is a characteristic graph showing a relation between the S element content and the colloidal particle size in sulfuric acid in an organic anti-shrink agent.

For the formed negative active material, the pore size distribution was measured. The same negative electrode plate as that used in the lead-acid battery performance test was produced, a negative active material was separated from the formed negative electrode plate, and the pore size distribution was measured by a mercury penetration method. The organic anti-shrink agent was dispersed at a concentration of 0.002 mass % in sulfuric acid having a specific gravity of 1.25 at 25° C. to obtain a colloidal solution, and the colloidal particle size distribution was measured by a laser light scattering method. The volume-based median pore size versus the S element content is shown in FIG. 10, the average of the volume-based colloidal particle size versus the S element content is shown in FIG. 11, and they are collectively shown in Table 6.

When the S element content was increased, the colloidal particle size and the median pore size decreased. Sulfonic acid groups or sulfonyl groups having high polarity and electron acceptability may be apt to appear on the surfaces of colloidal particles, and when the concentration of these groups is increased, electrostatic repulsion between sulfonic acid groups etc. is intensified. Therefore, it can be considered that the colloidal particle size of the organic anti-shrink agent was decreased by increasing the S element content. The particle size of the organic anti-shrink agent may affect the pore size distribution of the negative active material because the organic anti-shrink agent is dispersed in the negative active material, and it is considered that the pore size was decreased by decreasing the colloidal particle size of the organic anti-shrink agent. It can be considered that by decreasing the pore size, both initial high rate discharge performance at low temperature and high rate discharge performance at low temperature after high-temperature overcharge were improved as compared to before, and the duration time of 0.2 CA discharge was changed under the influence of the pore size.

The S element in the organic anti-shrink agent may exist as a sulfonic acid group, or exist as a sulfonyl group. By changing the ratio of bisphenol A and bisphenol S with the S element content in the organic anti-shrink agent fixed to 5000 μmol/g, the ratio of the sulfonyl group-derived S element content and the sulfonic acid group-derived S element content was changed. The results in this case are shown in Table 7. The results did not significantly depend on whether the S element was derived from a sulfonyl group or a sulfonic acid group. The same results were obtained even when the S element content was changed by performing condensation and sulfonation while changing the mixing ratio of bisphenols A, S and 1:

TABLE 6

S element content versus median pore size of negative active material and colloidal particle size of organic anti-shrink agent in sulfonic acid

| | S element content/μmol/g | | | | | | | | | | |
|---|---|---|---|---|---|---|---|---|---|---|---|
| | 3000 | 3500 | 4000 | 4500 | 5000 | 5500 | 6000 | 6500 | 7000 | 7500 | 600* |
| Active material median pore size (Initial)/μm | 13.0 | 8.0 | 7.0 | 4.5 | 1.2 | 1.1 | 0.6 | 0.4 | 0.2 | 0.1 | 12 |
| Colloidal particle size (25° C.)/μm | 12 | 7.9 | 6.7 | 4.0 | 1.0 | 0.8 | 0.5 | 0.1 | <0.1 | <0.1 | 10 |

*The sample with a S element content of 600 μmol/g is composed of lignin sulfonic acid, and shown as a comparative example.

TABLE 7

| | | | |
|---|---|---|---|
| S element content/μmol/g | | 5000 | |
| Sulfonyl group-derived S element content/μmol/g | 700 | 1400 | 2100 |
| Sulfonic acid group-derived S element content/μmol/g | 4300 | 3600 | 2900 |
| Initial high rate discharge duration time at low temperature/s | 186 | 185 | 189 |
| 0.2 CA discharge duration time/h | 6.5 | 6.5 | 6.5 |
| High rate discharge duration time at low temperature after high-temperature overcharge/s | 169 | 167 | 170 |
| Discharge time retention ratio/% | 91 | 90 | 90 |
| Colloidal particle size (25° C.)/μm | 1.0 | 1.0 | 1.0 |

Concentration of Organic Anti-Shrink Agent

The concentration of the organic anti-shrink agent in the negative active material is preferably not less than 0.08 mass % and not more than 0.25 mass %, especially preferably not less than 0.10 mass % and not more than 0.20 mass %. The results of changing the concentration of the organic anti-shrink agent in three stages: 0.10 mass %, 0.15 mass % and 0.20 mass % using the organic anti-shrink agent in the central row of Table 7 (the S element content is 5000 μmol/g, the sulfonyl group-derived S element content is 1400 μmol/g, and the sulfonic acid group-derived S element content is 3600 μmol/g) are shown in Table 8. Both the initial value of high rate discharge performance at low temperature and high rate discharge performance at low temperature after high-temperature overcharge were slightly improved with an increase in concentration of the anti-shrink agent, but there was no significant difference. The duration time of 0.2 CA discharge did not depend on the concentration of the organic anti-shrink agent.

of the negative active material decreased. By changing the density of the negative active material paste, the density of the negative active material after formation was changed within the range of 2.8 g/cm$^3$ to 3.8 g/cm$^3$, the concentration of the organic anti-shrink agent in the negative active material was changed within the range of 0.08 mass % to 0.25 mass %, and the S element content of the organic anti-shrink agent was changed within the range of 600 μmol/g to 7000 μmol/g. The resistance value of the negative active material in full charge was measured by a four-terminal method while the S element content per volume of the negative active material was changed within the range of 0.15 mg/cm$^3$ to 2.5 mg/cm$^3$ in the manner described above. The results are shown in FIG. 12 and Table 9. A synthetic organic anti-shrink agent composed of a bisphenol conden-

TABLE 8

| | | | |
|---|---|---|---|
| S element content/μmol/g | | 5000 | |
| Sulfonyl group-derived S element content/μmol/g | | 1400 | |
| Sulfonic acid group-derived S element content/μmol/g | | 3600 | |
| Content/mass % | 0.10 | 0.15 | 0.20 |
| Initial high rate discharge duration time at low temperature/s | 182 | 185 | 188 |
| 0.2 CA discharge duration time/h | 6.5 | 6.5 | 6.5 |
| High rate discharge duration time at low temperature after high-temperature overcharge/s | 155 | 167 | 169 |
| Discharge time retention ratio/% | 85 | 90 | 90 |
| Colloidal particle size (25° C.)/μm | 1.0 | 1.0 | 1.0 |

S Element Content Per Volume of Negative Active Material

It was found that when the S element content per volume of the negative active material was increased, the resistivity sation product was used except for the conventional example in which lignin (S element content: 600 μmol/g) was used. The resistivity is indicated by a relative value based on the value in the comparative example which is set to 100%.

TABLE 9

| | Conventional example | | | | | | | | | |
|---|---|---|---|---|---|---|---|---|---|---|
| | S element content (mg/cm$^3$) | | | | | | | | | |
| | 0.15 | 0.2 | 0.3 | 0.4 | 0.8 | 1 | 1.5 | 2 | 2.3 | 2.5 |
| Total amount of S in molecule (μmol/g) | 600 | 1500 | 3000 | 4000 | 4500 | 4000 | 6000 | 6000 | 7000 | 7000 |
| Content of anti-shrink agent in active material (mass %) | 0.2 | 0.1 | 0.08 | 0.08 | 0.15 | 0.2 | 0.2 | 0.25 | 0.25 | 0.25 |
| Resistance of active material* | 100 | 99 | 97 | 96 | 93.5 | 92.5 | 91 | 90 | 89.8 | 89.6 |

*A relative value based on the value in the conventional example which is set to 100.

When the S element content per volume of the negative active material is increased, resistivity decreases, leading to improvement of charge acceptability and improvement of high rate discharge performance at low temperature. The results of changing the kind of the organic anti-shrink agent, the S element concentration in the organic anti-shrink agent and the concentration of the organic anti-shrink agent showed that resistivity depended only on the S element content as shown in FIG. 12. FIG. 12 and Table 9 show that when the S element content of the negative active material is 0.3 mg/cm$^3$ or more, the resistivity of the negative active material markedly decreases, and when the S element content is 0.4 mg/cm$^3$, the resistivity further decreases. The dependency on the S element content decreases at 1.5 mg/cm$^3$ or more, and further decreases at 2.3 mg/cm$^3$ or more. Accordingly, the S element content is preferably 1.5 mg/cm$^3$ or less, especially preferably 2.3 mg/cm$^3$ or less. As a whole, the S element content is preferably not less than 0.3 mg/cm$^3$ and not more than 2.3 mg/cm$^3$, especially preferably not more than 0.4 mg/cm$^3$ and not less than 1.5 mg/cm$^3$.

Supplementary

Bisphenol A and Bisphenol S are used in the example, but a condensation product of sulfonated bisphenol F, or the like may be used. The sulfonic acid group and the sulfonyl group are not required to be directly bonded to the phenyl group in a bisphenol, and as in Patent Document 2, an alkyl chain etc. may be bonded to a bisphenol as an alkyl-aminobenzene-sulfonic acid etc. The organic anti-shrink agent is not limited to a bisphenol condensation product containing a sulfonic acid group, a sulfonyl group or the like, and for example, N,N'-(sulfonyldi-4,1-phenylene)bis(1,2,3,4-tetrahydro-6-methyl-2,4-dioxopyrimidine-5-sulfonamide) may be used. Further, the sulfonic acid group may exist in the form of an acid, or exist in the form of a salt such as a Na salt.

The bisphenol condensation product has a large amount of hydroxyl groups, and the hydroxyl groups are further polarized under the influence of sulfonyl groups and sulfonic acid groups, so that the charge density of the surfaces of colloidal particles composed of the anti-shrink agent increases. When the charge density increases, the particle size of the colloidal particles decreases. As a result, the median of the pore size decrease, high rate discharge performance at low temperature is improved, and the duration time of 0.2 CA discharge is changed.

The invention claimed is:

1. A lead-acid battery comprising:
a negative electrode material,
wherein the negative electrode material contains an organic anti-shrink agent, and
the organic anti-shrink agent is soluble in water under a neutral or basic condition, and has an average particle size of not less than 0.1 µm and not more than 9 µm when measured in sulfuric acid having a specific gravity of 1.25 at 25° C.

2. The lead-acid battery according to claim 1, wherein the average particle size of the organic anti-shrink agent when measured in sulfuric acid having a specific gravity of 1.25 at 25° C. is not less than 0.4 µm and not more than 9 µm.

3. The lead-acid battery according to claim 1, wherein the average particle size of the organic anti-shrink agent when measured in sulfuric acid having a specific gravity of 1.25 at 25° C. is not less than 0.4 µm and not more than 8 µm.

4. The lead-acid battery according to claim 1, wherein the negative electrode material contains lignosulfonic acid hydrolyzed in sulfuric acid.

5. A method for producing the lead-acid battery according to claim 4, wherein the lignosulfonic acid is hydrolyzed in sulfuric acid, and then included in the negative electrode material.

6. The lead-acid battery according to claim 1, wherein the median of the pore size of the negative electrode material is not less than 0.3 µm and not more than 8.0 µm.

7. A lead-acid battery comprising:
a negative electrode plate;
a positive electrode plate; and
an electrolyte solution,
wherein the negative electrode plate includes a negative electrode material,
the negative electrode material contains an organic anti-shrink agent, the negative electrode material contains a sulfur element (S element) in the organic anti-shrink agent,
the organic anti-shrink agent contains the sulfur element (S element) in an amount of 0.3 mg or more per unit volume (1 cm$^3$) of the negative electrode material, and
the content of the sulfur element (S element) in the organic anti-shrink agent is not less than 4500 µmol/g and not more than 6000 µmol/g.

8. The lead-acid battery according to claim 7, wherein the organic anti-shrink agent contains the sulfur element (S element) in an amount of 0.4 mg or more per unit volume (1 cm$^3$) of the negative electrode material.

9. The lead-acid battery according to claim 7, wherein the organic anti-shrink agent is a synthetic organic anti-shrink agent.

10. The lead-acid battery according to claim 7, wherein the organic anti-shrink agent contains a S element of at least one of a sulfonic acid group and a sulfonyl group.

11. The lead-acid battery according to claim 7, wherein the organic anti-shrink agent is a bisphenol condensation product containing a sulfur element (S element).

12. The lead-acid battery according to claim 7, wherein the median of the pore size of the negative electrode material is not less than 0.3 µm and not more than 8.0 µm.

13. The lead-acid battery according to claim 12, wherein the median of the pore size of the negative electrode material is not less than 0.6 µm and not more than 8.0 µm.

14. The lead-acid battery according to claim 12, wherein the median of the pore size of the negative electrode material is not less than 0.6 µm and not more than 7.5 µm.

15. A lead-acid battery comprising:
a negative electrode plate;
a positive electrode plate; and
an electrolyte solution,
wherein the negative electrode plate includes a negative electrode material,
the negative electrode material contains an organic anti-shrink agent, the negative electrode material contains a sulfur element (S element) in the organic anti-shrink agent,
the organic anti-shrink agent contains the sulfur element (S element) in an amount of 0.3 mg or more per unit volume (1 cm$^3$) of the negative electrode material,
the organic anti-shrink agent is a condensation product of a bisphenol containing a sulfur element (S element), the bisphenol including bisphenol A, S or F, and
the content of the sulfur element (S element) in the organic anti-shrink agent is not less than 4500 µmol/g and not more than 6000 µmol/g.

* * * * *